United States Patent [19]

Chevillat et al.

[11] Patent Number: 5,113,401
[45] Date of Patent: May 12, 1992

[54] BLOCK CODING SCHEME FOR FRACTIONAL-BIT TRANSMISSION

[75] Inventors: Pierre R. Chevillat, Kilchberg; Evangelos S. Eleftheriou, Zurich; Dietrich G. U. Maiwald, Wadenswil, all of Switzerland

[73] Assignee: International Business Machines Corporation, Armonk, N.Y.

[21] Appl. No.: 400,415

[22] Filed: Aug. 30, 1989

[30] Foreign Application Priority Data

Jul. 7, 1989 [EP] European Pat. Off. .......... 89810516

[51] Int. Cl.⁵ .................... G06F 11/10; H03M 13/12
[52] U.S. Cl. ......................................................... 371/43
[58] Field of Search .................................... 371/43, 22.3

[56] References Cited

U.S. PATENT DOCUMENTS

| | | | |
|---|---|---|---|
| 4,077,021 | 2/1978 | Csajka et al. | 371/43 |
| 4,747,104 | 5/1988 | Piret | 371/38.1 |
| 4,755,998 | 7/1988 | Gallager | 371/43 |
| 4,757,506 | 7/1988 | Heichler | 371/43 |
| 4,761,784 | 8/1988 | Srinivasagopalan et al. | 371/43 |
| 4,797,887 | 1/1989 | Yamasaki et al. | 371/43 |
| 4,829,237 | 5/1989 | Segawa et al. | 371/22.1 |
| 4,897,838 | 1/1990 | Tateishi | 371/22.3 |
| 4,912,395 | 3/1990 | Sato et al. | 371/22.3 |

FOREIGN PATENT DOCUMENTS 0122805 10/1984 European Pat. Off. .

OTHER PUBLICATIONS

"Decoding of Trellis-Encoded Signals in the Presence of Intersymbol Interference and Noise" Chavillat et al., IEEE 1988, pp. 694-698 and 6690.
"Trellis-Coded Modulation w/ Multidimensional Constellations" Wei, IEEE 1987, pp. 483-501.
"Channel Coding with Multilevel/Phase Signals" Gottfried Ungerboeck, IEEE 1981, pp. 55-67.
IEEE Journal on Selected Areas in Communication, vol. SAC-2, No. 5, Sep. 1984, pp. 632-647; G. Forney et al.: "Efficient Modulation for Band-Limited Channels", p. 637, col. 2, paragraph 3—p. 638, col. 1, paragraph 1; FIG. 15.

Primary Examiner—Jerry Smith
Assistant Examiner—Phung M. Chung
Attorney, Agent, or Firm—Edward H. Duffield

[57] ABSTRACT

In a trellis-coded modulation (TCM) transmission system, data bits are grouped into bit blocks (13), and each such bit block is encoded to select a fixed number w of symbols from a given symbol set (14). The symbols are subdivided into subsets, and each subset includes a few outer symbols and a greater number of inner symbols. Each symbol represents one particular transmission signal value. A first portion (17) of each bit block is separated into w bit subgroups, each of which is separately expanded by a convolutional encoder (20) to obtain a bit combination (19, 15) for specifying one of the symbol subsets. The remaining portion (21) of each bit block is expanded by a block coder (22) to obtain w bit subgroups (23), each being a bit combination (25, 16) for selecting one particular symbol out of a specified subset; outer symbols are selected less frequently than inner symbols. The arrangement allows to transmit a non-integer number of data bits per symbol, and further allows to operate with single-symbol TCM.

11 Claims, 5 Drawing Sheets

BLOCK CODING SCHEME FOR FRACTIONAL-BIT TRANSMISSION

DESCRIPTION

1. Field of Invention

Present invention is concerned with coding of data for transmission using trellis-coded modulation, and in particular with a method and apparatus for converting a bit stream representing data into symbols of an expanded two-dimensional symbol set. Each of these symbols is to be used for modulating a carrier to assume a discrete signal value.

2. Background

Several methods and systems for trellis-coded modulation of data are known. The basic scheme was disclosed in U.S. Pat. No. 4,077,021 to I. P. Csajka and G. Ungerboeck: "Method and Arrangement for Coding Binary Signals and Modulating a Carrier Signal". A further description is contained in an article by G. Ungerboeck entitled "Channel Coding with Multilevel-/Phase Signals", IEEE Transactions on Information Theory, Vol. IT-28, No. 1, January 1982, pp.55–67. In the systems disclosed in these descriptions, each symbol (signal value) represents an integer number of data bits. This is appropriate when the data rate (bit rate) is a multiple of the symbol rate (Baud rate).

An article by L. F. Wei "Trellis-Coded Modulation with Multidimensional Constellations", IEEE Transactions on Information Theory Vol. IT-33, No. 4, July 1987, pp.483–501, also describes the transmission of an integer number of data bits per symbol. However, the respective system uses multi-symbol trellis-coded modulation (TCM) whose trellis branches are labelled with several symbols. This means that it is necessary to encode and decode several symbols together.

In U.S. Pat. No. 4,483,012 to L. F. Wei entitled "Differentially Convolutional Channel Coding with Expanded Set of Signalling Alphabets", another TCM system is disclosed with also transmits an integer number of bits per symbol. It uses external differential coding so that phase ambiguity of the expanded signal alphabet is removed.

In certain cases it is desirable, however, to transmit a non-integral number of bits per symbol. Fractional-bit transmission allows a better match between symbol rate and available channel bandwidth. For example, telephone line modems for 14.4 kbit/s typically employ single-symbol TCM with a symbol rate of 2400 baud and 6 bits per symbol. While transmitting 5 bits per symbol leads to to an unacceptably large symbol rate of 2880 baud, a larger fraction of the available bandwidth could be exploited with the transmission of a non-integer number of bits per symbol. Furthermore, for modems operating at a higher speed of e.g. 19.2 kbit/s and transmitting an integer number of e.g. 7 bits per symbol (resulting e.g. in a symbol rate of 2,743 Baud), it would be of interest in certain situations to be able to operate at a lower data rate, e.g. 16.8 kbit/s, but maintaining the same symbol rate. This will also require the transmission of a non-integer number of data bits per symbol.

A publication by G. D. Forney et al. "Efficient Modulation for Band-Limited Channels", IEEE Journal on Selected Areas in Communications, Vol. SAC-2, No. 5, September 1984, pp.632–647, describes several modulation schemes for transmitting data. It mentions the uncoded transmission of data where $n+\frac{1}{2}$ bits can be represented by each symbol, but does not consider trellis-coded modulation for such transmission.

OBJECTS OF THE INVENTION

It is an object of the invention to devise a coding scheme for a transmission system using trellis-coded modulation, which permits the transmission of any fractional number of bits per symbol.

It is another object to provide a coding scheme allowing to transmit a fractional number of bits in a TCM transmission system, which is based on two-dimensional symbol sets, and which allows single-symbol handling.

A further object of the invention is a TCM transmission system with a non-integer number of bits per symbol, which allows to combine in the receiver the functions of equalizing and trellis decoding.

Another object of the invention is to provide a coding scheme for TCM transmission allowing the transmission of a fractional bit number per symbol, which is simple in design.

SUMMARY OF THE INVENTION

These objects are achieved by an encoding method and an encoding apparatus as defined in claims 1 and 2. Preferred particular embodiments of this method and of the apparatus are defined in the dependent claims.

The invention achieves the objects mainly by providing a particular combination of trellis encoding on blocks of data bits, and by expanding and block encoding a portion of each block to obtain the selection of symbols from particular symbol subsets.

An advantage of present invention is that it allows to transmit any fractional number of bits per symbol and thus to freely select any desired data rate (bit rate) for a given symbol rate (Baud rate).

A further advantage is that with the novel coding scheme, it is possible to make decisons on single symbols for receiver adaptation thus preventing the necessity of waiting for the end of a whole group of symbols to make a decision, which introduces an undesirable delay.

Another advantage of the invention is that it can be used in systems applying combined equalization and trellis decoding, which results in enhanced performance in the presence of intersymbol interference.

A further advantage is that the coding technique is designed for two-dimensional trellis-coded systems so that no complicated procedures and circuits need be used which are required for multi-dimensional TCM schemes.

Application of the novel coding scheme results in a higher noise margin due to the fact that smaller signal constellations can be used, and it further results in better receiver performance in the presence of nonlinear distortion.

The coding scheme is also well suited for digital radio and satellite transmission systems.

These and other advantages will become more apparent from the following description of preferred embodiments of the invention with reference to the drawings.

LIST OF DRAWINGS

FIG. 4 is a sample of a symbol set comprising 144 symbols, which is used with the embodiment of FIG. 2.

Figure 2:
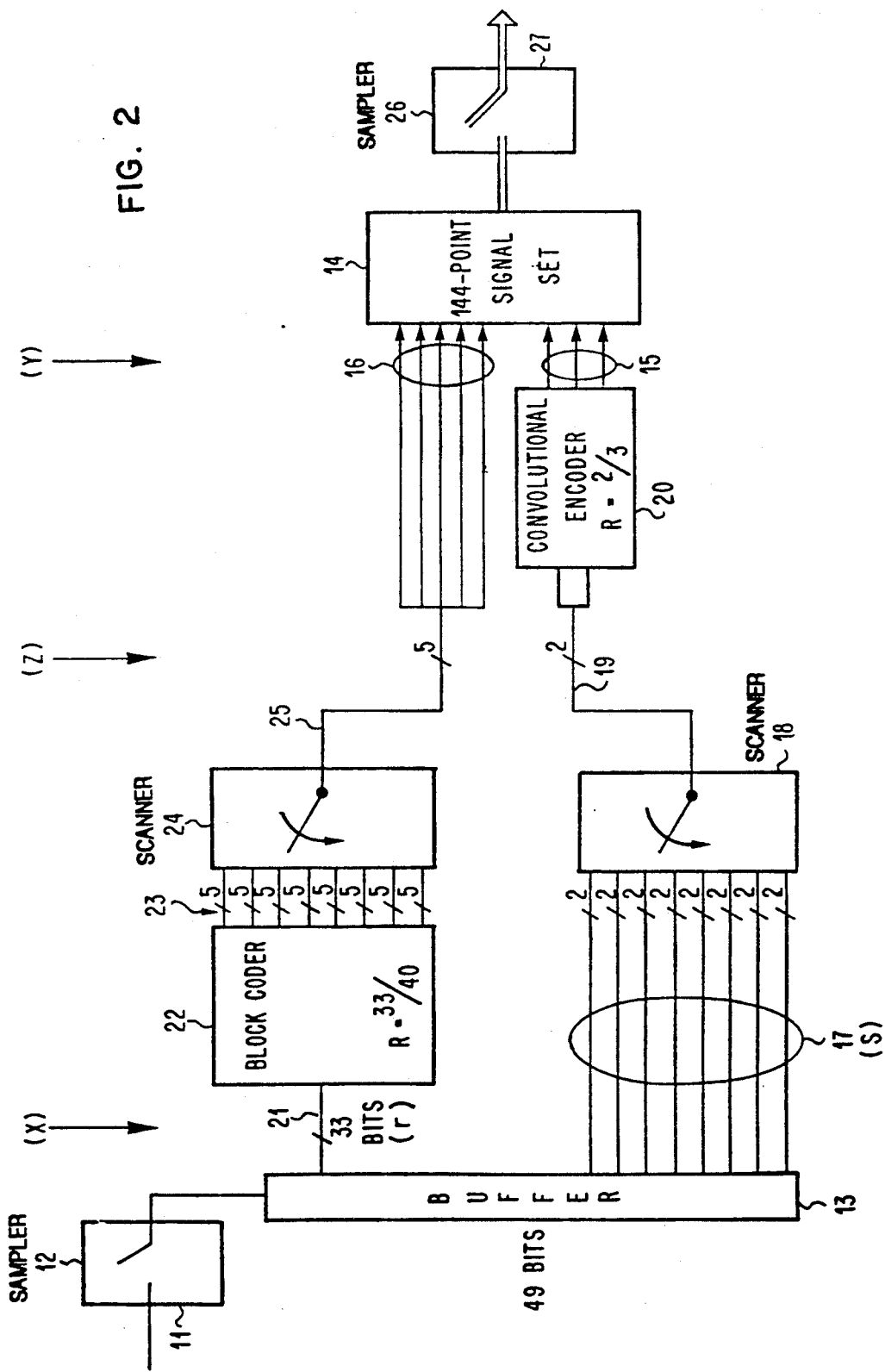
FIG. 2 shows the block diagram of one embodiment of encoder apparatus employing the invention.
Figure 3:
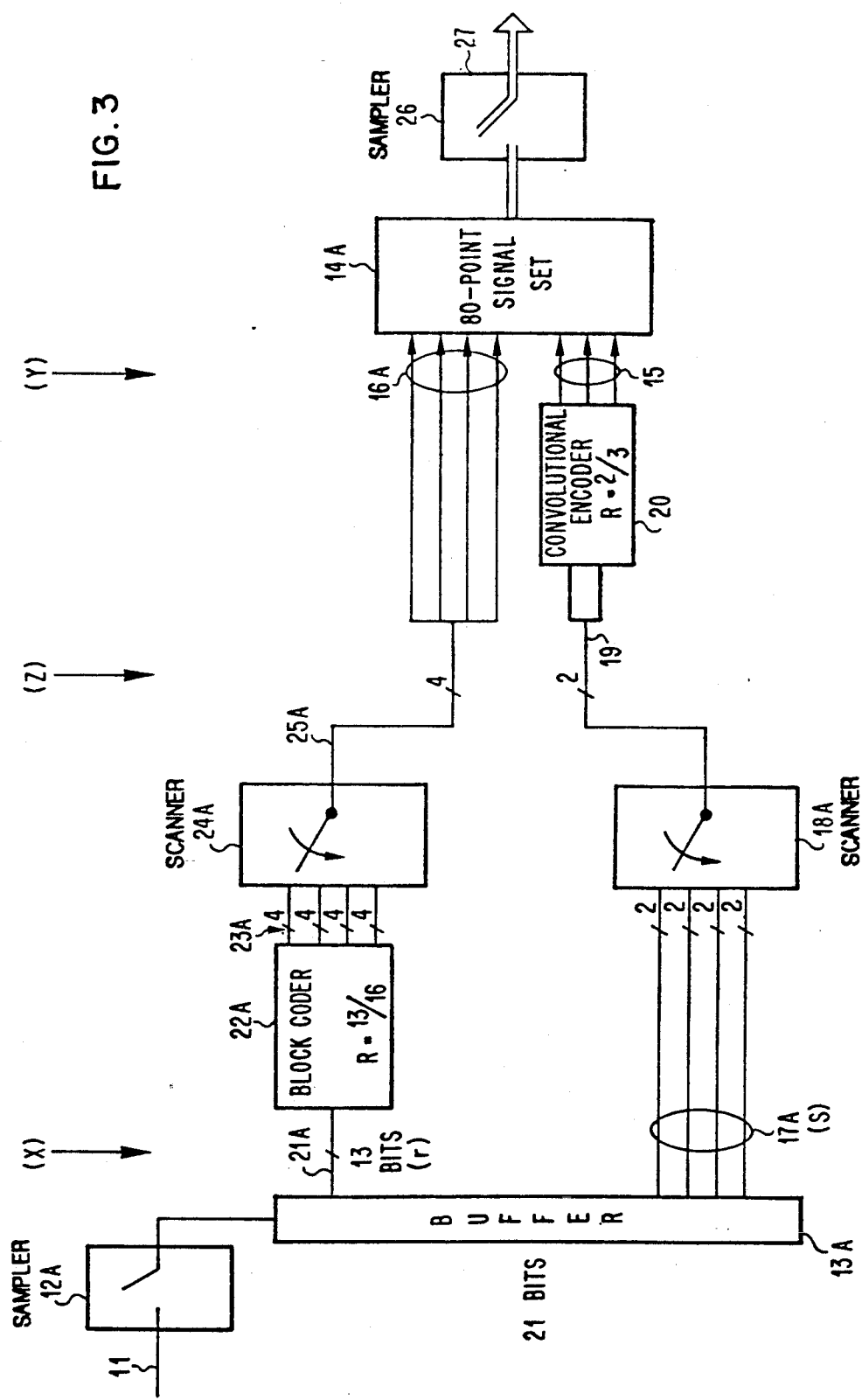
FIG. 3 shows the block diagram of another embodiment of encoder apparatus using the invention.

Table 1 (consisting of partial tables 1A and 1B) shows the mapping of input bits to output bits in the block encoder used in the example of FIG. 2; and Table 2 shows the mapping of input bits to output bits in the block encoder used in the example of FIG. 3.

DETAILED DESCRIPTION

Figure 1:
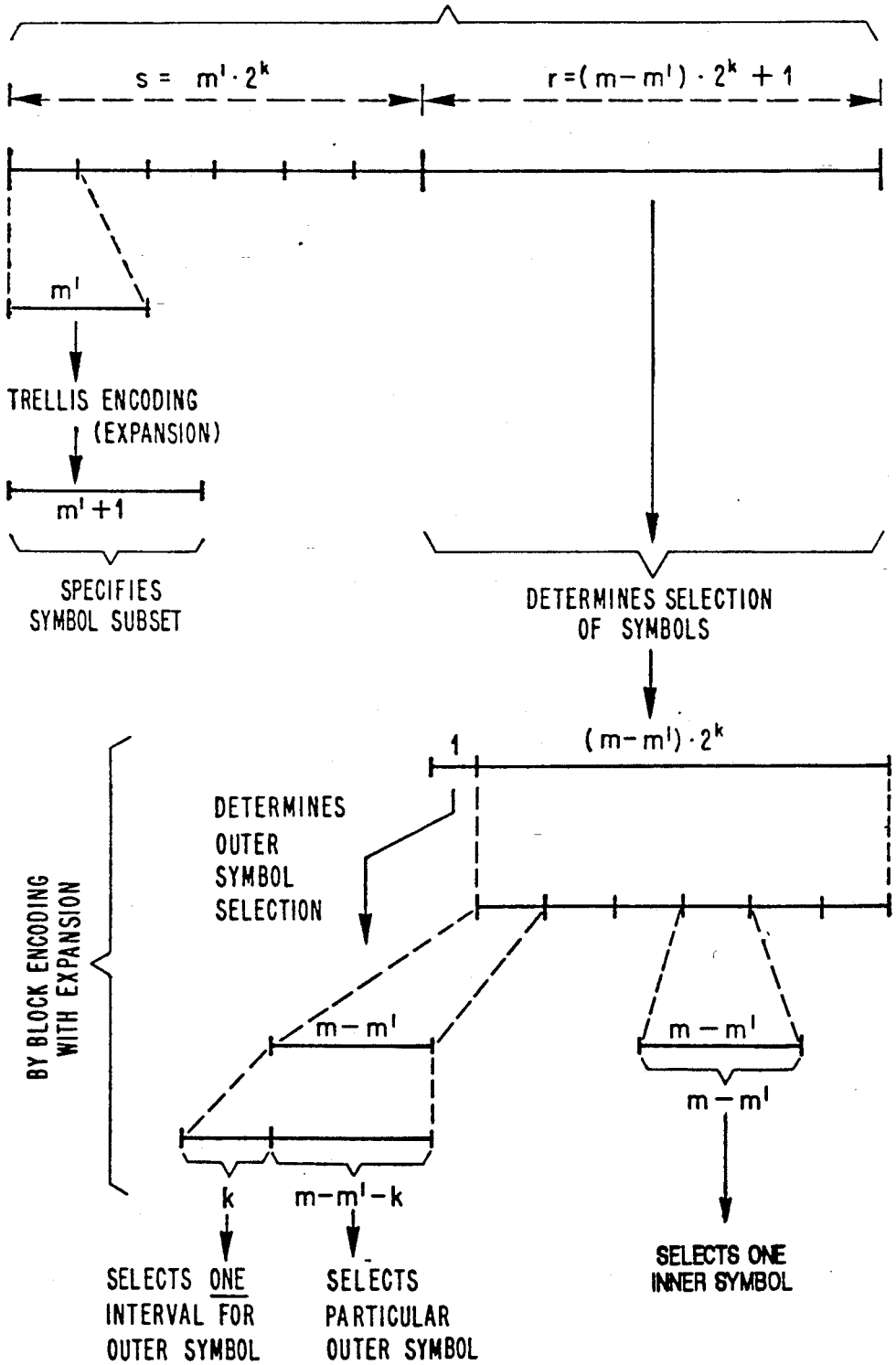
FIG. 1A is a schematic representation of the encoding procedure by which the incoming bit stream is converted blockwise into symbols selected from a given symbol set.

FIG. 1 shows steps of the coding procedure used by the invention. Principally, the invention allows to transmit $m+v/w$ data bits per symbol. In the embodiments that will be shown, cases have been selected where $v=1$ and $m=2^k$.

Basically, the incoming bit stream is grouped into blocks, and each block will be represented by a fixed number w of symbols. A first portion (s) of each block is used to specify sequentially the w different subsets from which the w symbols are to be taken. Trellis encoding is employed for this portion to thus achieve the advantages of single-symbol Trellis-Coded Modulation (TCM) which are already known from previous systems. Single-symbol TCM means that symbols need not be handled in groups; rather, each symbol can be transmitted and decoded separately.

The second portion (r) of each block is used to select, in w successive intervals, from each of the w subsets specified by the first portion, one specific symbol.

In more detail, the procedure illustrated in FIG. 1 works as follows:

Incoming information bits are grouped into blocks of $m \cdot 2^k + 1$ bits and sent out to the channel as w symbols in $w = 2^k$ successive signaling intervals. In each signaling interval m' information bits enter the trellis encoder and the resulting $m'+1$ coded bits specify which 2D symbol subset is to be used in this particular signaling interval. Therefore, out of the total $m \cdot 2^k + 1$ information bits per block, $m' \cdot 2^k$ bits are reserved as successive inputs to the convolutional encoder and will specify a sequence of $w = 2^k$ subsets. The remaining $(m-m')2^k + 1$ information bits determine which symbols from the sequence of $2^k$ subsets are to be transmitted. One bit in the remaining block of $(m-m')2^k + 1$ information bits determines whether some outer symbol from the chosen $2^k$ successive subsets is to be transmitted. If not, then the $(m-m')2^k$ bits are used, $m-m'$ at a time, to select $2^k$ inner subset points. If an outer subset point is to be transmitted, then k additional bits determine which of the $2^k$ successive subset symbols is the outer one, $m-m'-k$ bits select which particular outer symbol, and the remaining $(m-m')(2^k-1)$ bits select which are the inner subset symbols. Note that transmission of an outer symbol occurs at most once per block. The distinction between outer and inner symbols will be seen later when the symbol sets are shown.

The procedure for encoding or symbol selection described above and illustrated in FIG. 1 can also be described by formal programming language notation as shown in the following block of statements:

```
do i = 0 to 2^k - 1
    do j = 1 to m'
        Z_{n-i}^j = X^{i m'-j}
        ******************> assign m' bits per
            interval for encoding
    end
end
if Z_{2^k m'-1} = 0 then do
******************> send only inner points
    do i = 0 to 2^k - 1
        Z_{n-i}^{m'-1} = 0
        ******************> bit m' + 1 is zero for inner point
        do j = 1 to m - m'
            Z_{n-i}^{m'-j-1} = X^{2^k m'-1+i(m-m')+j}
            ******************> specify which inner point
        end
    end
end
else do
******************> send 2^k - 1 inner points and
one outer point
    s = 0
    do j = 0 to k - 1
        s = s + X^{2^k m'-2-j} \times 2^j
        ******************> compute interval number s when
            outer symbol is sent
    end Z_{n-s}^{m'-1} = 1
    ******************> bit m' + 1 is one for outer point
    do j = 1 to m - m' - k
        Z_{n-s}^{m'-1-j} = X^{2^k m'-1-k-j}
        ******************> specify which outer point is sent
    end
    do j = m - m' - k + 1 to m - m'
        Z_{n-s}^{m'-1-j} = 0
        ******************> set remaining bits to zero
    end
    r = 0
    do i = 0 to 2^k - 1
    ******************> send 2^k - 1 inner points
        if i = s then r = r + m - m'
        ******************> skip interval for outer point
        else do
            Z_{n-i}^{m'+1} = 0
            ******************> bit m' + 1 is zero
                for inner point
            do j = 1 to m - m'
                Z_{n-i}^{m'-1-j} = X^{2^k m'-1+m-m'+i(m-m')-j-r}
                ******************> specify which
                    inner point
            end
        end
    end
end
```

In the above procedure, "X" designates input bits of a stored bit block, and "Z" designates intermediate bits which are either fed into the convolutional encoder for subset specification, or directly used for symbol selection (cf. designations X and Z in FIGS. 2 and 3).

In the receiver, estimated bits "$\hat{Z}$" delivered by a TCM decoder are mapped into estimated bits "$\hat{X}$" by performing the inverse of the procedure described above.

As is indicated in FIG. 1, the steps for determining the selection of an individual symbol (in each of the $w = 2^k$ time intervals) from the second portion of each bit block, are achieved by block encoding (and expanding) the whole second portion. This will become more clear from the following description of embodiments of the coding apparatus, and from a detailed example of two specific block codes (which will be illustrated and explained later).

In FIG. 2, the embodiment of an encoding system for a modem operating at 16.8 kbit/s is shown. Following parameter values are assumed for this example:

Symbol set: - - - N=144 symbols (Example cf. FIG. 4)
Subsets: - - - t=8 subsets (each comprising 18 symbols)
Fixed number: - - - m=6
Number of symbols (intervals) per block: - - - $w=2^k=8$ (k=3)
Bits per block: - - - $b=m\cdot 2^k+1=49$
First portion: - - - s=16 bits (8 subgroups each p=2 bits)
Second portion: - - - r=33 bits
Block coder output: - - - l=40 bits (8 subgroups each q=5 bits)

The input signal on line 11 is sampled by a sampler 12, 16'8000 times per second to obtain the input bits. Blocks of 49 bits are stored in a buffer 13. (Actually, two buffers are used alternately so that while one is filled, the contents of the other can be processed).

A symbol selector 14 at the output of the coding system selects, in response to the signals on input lines 15 and 16, (which signals are derived from the contents of buffer 13), eight symbols in eight successive time intervals.

A first portion s (16 bits) of the bits stored in the buffer is provided on output lines 17 in eight subgroups, each having p=2 bits. A scanner 18 scans outputs 17 so that in each successive time interval, two bits appear on lines 19. These are provided to a convolutional rate ⅔ encoder 20 which provides in each time interval an expanded group of three bits on lines 15. This three-bit combination specifies, in selector 14, one of the eight symbol subsets.

Figure 5:
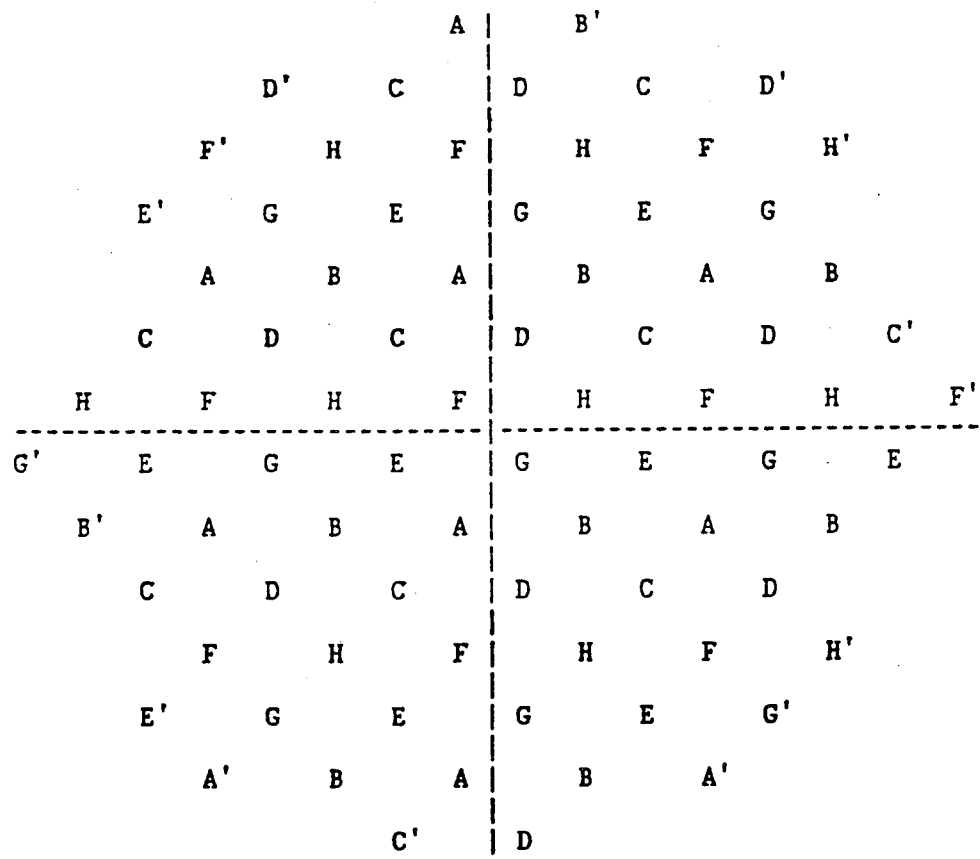
FIG. 5 is a sample of a symbol set comprising 80 symbols, which is used with the embodiment of FIG. 3.

The convolutional encoder can be of any design. One example is shown in FIG. 5 of U.S. Pat. No. 4,077,021. Other examples are given in the above-mentioned publication by G. Ungerboeck.

A second portion r (33 bits) of the bits stored in the buffer is furnished on lines 21 to a block coder 22. This is a rate 33/40 coder, i.e. it provides 40 output bits for each group of 33 input bits. These 40 bits are furnished as eight subgroups of q=5 bits each, on lines 23. Each five-bit subgroup determines one particular symbol of a specified symbol subset comprising eighteen bits. Block coder 22 implements the procedure steps shown in the bottom of FIG. 1; a specific example will be shown and explained with reference to FIG. 4 and Table 1.

The output lines 23 are sampled by a scanner 24 to provide p=5 bits at a time (in each signaling interval) on lines 25, which in turn are connected to inputs 16 of the symbol selector, to select one specific symbol.

The selected symbols are furnished from selector 14 to a sampler 26 which provides 2'743 symbols per second on output lines 27. These are used for modulating a carrier signal.

In FIG. 3, a similar coding system is shown which is designed for another set of parameter values as follows:
Symbol set: - - - N=80 symbols (Example cf. FIG. 5)
Subsets: - - - t=8 subsets (each comprising 10 symbols)
Fixed number: - - - m=5
Number of symbols (intervals) per block: - - - $w=2^k=4$ (k=2)
Bits per block: - - - $b=m\cdot 2^k+1=21$
First portion: - - - s=8 bits (4 subgroups each p=2 bits)
Second portion: - - - r=13 bits
Block coder output: - - - l=16 bits (4 subgroups each q=4 bits)

The units of this second encoder system are very similar to those of the first one (same reference numbers used), except that the buffer 13A holds 21 bits, the symbol selector 14A has an 80-symbol set, the block coder 22A is a rate 13/16 coder, and the two scanners 18A and 24A each have four sequential positions. Furthermore, the sampler 12A obtains 14'400 bits per second. Operation need not be described in detail because it is analogous to that of the coding system shown in FIG. 2.

Block coder 22A implements the procedure steps shown in the bottom of FIG. 1; a specific example will be shown and explained later with reference to FIG. 5 and Table 2.

SYMBOL SETS

Figure 4:
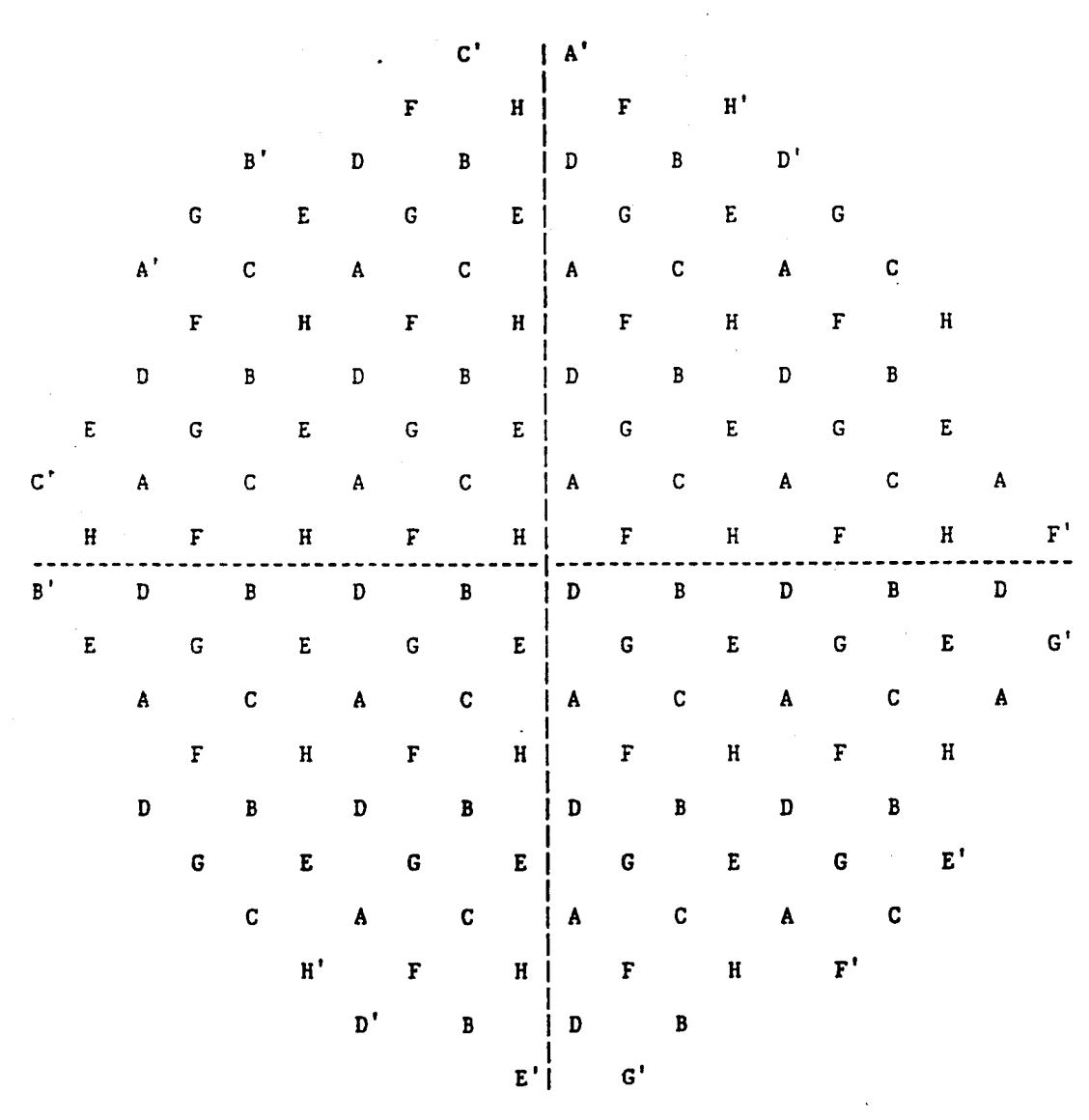

The specific symbol sets used for the two examples described above are shown in FIGS. 4 and 5. FIG. 4 depicts the 144-symbol set used for the coding system shown in FIG. 2. The eight symbol subsets into which the whole set is subdivided are designated by letters A through H. In the configuration of symbols of FIG. 4, each position (point) shows by a respective letter to which subset the particular symbol located there belongs. Some of the symbols are outer symbols, and they are designated by A', B', etc. As can be seen, there are altogether sixteen outer symbols, two per subset. Thus, each subset comprises eighteen symbols, of which sixteen are inner symbols and two are outer symbols. The individual identification or address of each symbol in the whole set is given by an 8-bit label ($y_n^0$, $y_n^1$, $y_n^2$, $y_n^3$, $y_n^4$, $y_n^5$, $y_n^6$, $y_n^7$), as will be shown in the next section.

It should be noted that the inner group of the constellation consists of 128 points, whereas the outer group consists of sixteen points which is only one eighth of the inner group.

FIG. 5 depicts the 80-symbol set used for the example of FIG. 3. Subdivision into eight subsets, each of which has two outer symbols, is similar as explained above with respect to the 144-symbol case. Thus, each subset in the case of FIG. 5 comprises ten symbols, of which eight are inner and two are outer symbols. Identification of each individual symbol is achieved by a 7-bit label ($y_n^0$, $y_n^1$, $y_n^2$, $y_n^3$, $y_n^4$, $y_n^5$, $y_n^6$), as will be shown in more detail in the next section.

It should be noted that the inner group of this constellation consists of 64 points, whereas the outer group consists of sixteen points which is only one quarter of the inner group.

The assignment between the labels (i.e. $y_n^0$, $y_n^1$, $y_n^2$, $y_n^3$, $y_n^4$, ...) which are actually symbol addresses, and the symbol locations in the symbol sets (FIG. 4, FIG. 5) can be done in several ways without affecting the invention.

Following are examples: With eight symbol subsets, the first three bits of the labels designate the subset (i.e. all symbols of the A-set have an identical group of three first bits in the label); the remaining label bits distinguish points within the subset.

With two outer symbols and sixteen inner symbols (example of FIG. 4), the five bits ($y_n^3$, $y_n^4$, $y_n^5$, $y_n^6$, $y_n^7$) representing the subset-internal label would be X1000 for the two outer symbols and X0XXX for the sixteen inner symbols.

BIT MAPPING IN BLOCK CODER

As was stated above already, a block coder is used for converting a portion r of each bit block to an expanded bit group which consists of w different q-bit subgroups, each for selecting one particular symbol of a specified symbol subset. This encoder implements the steps shown at the bottom of FIG. 1, i.e. using one bit of the portion r for determining whether an outer symbol is to be selected, and using the other bits to determine which (if any) of the w symbols is to be the outer symbol, and further for selecting in each of the w time intervals one specific (inner or outer) symbol.

The mapping of input bits to output bits in this block encoder, i.e. the particular selection of symbols, is important for an efficient coding procedure. Therefore, two particularly suitable bit mapping examples for the block coder, one for the case of FIG. 2 and another one for that of FIG. 3, have been drafted. They are shown in Table 1 and Table 2, respectively.

Table 1 (separated into partial Tables 1A and 1B) shows the bit mapping for the block coder 22 of FIG. 2, i.e. for the case where 33 bits of the current bit block (portion r) are expanded into 40 bits which constitute eight different bit subgroups each consisting of five bits (for selecting one particular symbol out of eighteen symbols of a symbol subset).

Note that the bits of each 49-bit block are designated as $x_1, x_2, \ldots, x_{49}$. The portion s of the bit block (used for specifying, after being trellis encoded, the symbol subsets) includes the sixteen bits $x_{34}, x_{35}, \ldots, x_{49}$. These bits of the first portion s of the bit block produce, at the output of the trellis encoder 20, the subset specifying bits $(y_{n-i}^0, y_{n-i}^1, y_{n-i}^2)$, with i=0, 1, 2, 3, 4, 5, 6, 7.

The remaining 33 bits $(x_1, x_2, \ldots, x_{33})$, i.e. portion r of the bit block, are mapped by the rate 33/40 block encoder, as shown in Table 1 to eight sets of bits $(y_{n-i}^3, y_{n-i}^4, y_{n-i}^5, y_{n-i}^6, y_{n-i}^7)$, i=0,1,2,3,4,5,6,7. The set of eight 8-bit labels $(y_{n-i}^0, y_{n-i}^1, y_{n-i}^2, y_{n-i}^3, y_{n-i}^4, y_{n-i}^5, y_{n-i}^6, y_{n-i}^7)$, i=0,1,2,3,4,5,6,7 thus selects eight unique members of the 144-point signal constellation which are transmitted over the channel in accordance to the coding rules of single-symbol TCM.

Table 2 shows the bit mapping for the block coder 22A of FIG. 3, i.e. for the case where 13 bits of the current bit block (portion r) are expanded into sixteen bits which constitute four different bit subgroups each consisting of four bits (for selecting one particular symbol out of ten symbols of a symbol subset).

Note that the bits of each 21-bit block are designated as $x_1, x_2, \ldots, x_{21}$. The portion s of the bit block (used for specifying, after being trellis encoded, the symbol subsets) includes the eight bits $x_{14}, x_{15}, \ldots, x_{21}$. These bits of the first portion s of the bit block produce, at the output of the trellis encoder 20, the subset specifying bits $(y_{n+i}^0, y_{n+i}^1, y_{n+i}^2)$, with i=0, 1, 2, 3.

The remaining 13 bits $(x_1, x_2, \ldots, x_{13})$ are mapped by the rate 13/16 block encoder, as shown in Table 2 to four sets of bits $(y_{n+i}^3, y_{n+i}^4, y_{n+i}^5, y_{n+i}^6)$, i=0,1,2,3. The set of four 7-bit labels $(y_{n+i}^0, y_{n+i}^1, y_{n+i}^2, y_{n+i}^3, y_{n+i}^4, y_{n+i}^5, y_{n+i}^6)$, i=0,1,2,3 thus selects four unique members of the 80-point signal constellation which are transmitted over the channel in accordance to the coding rules of single-symbol TCM.

COMBINED EQUALIZATION AND TRELLIS DECODING IN RECEIVER

The block coding scheme of present invention has proven to be very useful in combination with a receiver design in which the functions of equalization and trellis decoding are combined. Such a receiver has been described in a paper by P. R. Chevillat and E. Eleftheriou "Decoding of Trellis-Encoded Signals in the Presence of Intersymbol Interference and Noise", IEEE Conference Record, ICC'88, June 1988, pp. 694-699.

TABLE 1A 16.8 kbits/s: Bit Mapping
Rate 33/40 Block Code

| $x_1x_2x_3x_4$ | $y_n^3y_n^4y_n^5y_n^6y_n^7$ | $y_{n-1}^3y_{n-1}^4y_{n-1}^5y_{n-1}^6y_{n-1}^7$ | $y_{n-2}^3y_{n-2}^4y_{n-2}^5y_{n-2}^6y_{n-2}^7$ | $y_{n-3}^3y_{n-3}^4y_{n-3}^5y_{n-3}^6y_{n-3}^7$ |
|---|---|---|---|---|
| 0XXX | $x_{26}0x_2x_3x_4$ | $x_{27}0x_5x_6x_7$ | $x_{28}0x_8x_9x_{10}$ | $x_{29}0x_{11}x_{12}x_{13}$ |
| 1000 | $x_{26}1000$ | $x_{27}0x_5x_6x_7$ | $x_{28}0x_8x_9x_{10}$ | $x_{29}0x_{11}x_{12}x_{13}$ |
| 1001 | $x_{27}0x_5x_6x_7$ | $x_{26}1000$ | $x_{28}0x_8x_9x_{10}$ | $x_{29}0x_{11}x_{12}x_{13}$ |
| 1010 | $x_{27}0x_5x_6x_7$ | $x_{28}0x_8x_9x_{10}$ | $x_{26}1000$ | $x_{29}0x_{11}x_{12}x_{13}$ |
| 1011 | $x_{27}0x_5x_6x_7$ | $x_{28}0x_8x_9x_{10}$ | $x_{29}0x_{11}x_{12}x_{13}$ | $x_{26}1000$ |
| 1100 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |
| 1101 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |
| 1110 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |
| 1111 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |

TABLE 1B 16.8 kbits/s: Bit Mapping
Rate 33/40 Block Code

| $x_1x_2x_3x_4$ | $y_{n+4}^3y_{n+4}^4y_{n+4}^5y_{n+4}^6y_{n+4}^7$ | $y_{n+5}^3y_{n+5}^4y_{n+5}^5y_{n+5}^6y_{n+5}^7$ | $y_{n+6}^3y_{n+6}^4y_{n+6}^5y_{n+6}^6y_{n+6}^7$ | $y_{n+7}^3y_{n+7}^4y_{n+7}^5y_{n+7}^6y_{n+7}^7$ |
|---|---|---|---|---|
| 0XXX | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1000 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1001 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1010 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1011 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1100 | $x_{26}1000$ | $x_{31}0x_{17}x_{18}x_{19}$ | $x_{32}0x_{20}x_{21}x_{22}$ | $x_{33}0x_{23}x_{24}x_{25}$ |
| 1101 | $x_{31}0x_{17}x_{18}x_{19}$ | $x_{26}1000$ | $x_{32}0x_{20}x_{21}x_{22}$ | $x_{33}0x_{23}x_{24}x_{25}$ |
| 1110 | $x_{31}0x_{17}x_{18}x_{19}$ | $x_{32}0x_{20}x_{21}x_{22}$ | $x_{26}1000$ | $x_{33}0x_{23}x_{24}x_{25}$ |
| 1111 | $x_{31}0x_{17}x_{18}x_{19}$ | $x_{32}0x_{20}x_{21}x_{22}$ | $x_{33}0x_{23}x_{24}x_{25}$ | $x_{26}1000$ |

TABLE 2

14.4 kbits/s: Bit Mapping
Rate 13/16 Block Code

| $x_1x_2x_3$ | $y_n^3y_n^4y_n^5y_n^6$ | $y_{n+1}^3y_{n+1}^4y_{n+1}^5y_{n+1}^6$ | $y_{n+2}^3y_{n+2}^4y_{n+2}^5y_{n+2}^6$ | $y_{n+3}^3y_{n+3}^4y_{n+3}^5y_{n+3}^6$ |
|---|---|---|---|---|
| 0XX | $x_{10}0x_2x_3$ | $x_{11}0x_4x_5$ | $x_{12}0x_6x_7$ | $x_{13}0x_8x_9$ |

TABLE 2-continued

| | | 14.4 kbits/s: Bit Mapping Rate 13/16 Block Code | | | |
|---|---|---|---|---|---|
| $x_1x_2x_3$ | $y_n^3y_n^4y_n^5y_n^6$ | $y_{n-1}^3y_{n-1}^4y_{n-1}^5y_{n-1}^6$ | $y_{n-2}^3y_{n-2}^4y_{n-2}^5y_{n-2}^6$ | $y_{n-3}^3y_{n-3}^4y_{n-3}^5y_{n-3}^6$ | |
| 100 | $x_{10}100$ | $x_{11}0x_4x_5$ | $x_{12}0x_6x_7$ | $x_{13}0x_8x_9$ | |
| 101 | $x_{11}0x_4x_5$ | $x_{10}100$ | $x_{12}0x_6x_7$ | $x_{13}0x_8x_9$ | |
| 110 | $x_{11}0x_4x_5$ | $x_{12}0x_6x_7$ | $x_{10}100$ | $x_{13}0x_8x_9$ | |
| 111 | $x_{11}0x_4x_5$ | $x_{12}0x_6x_7$ | $x_{13}0x_8x_9$ | $x_{10}100$ | |

We claim:

1. Method of encoding data by converting a bit stream representing the data into symbols of an expanded two-dimensional symbol set which is not a power of two said method comprising the steps of:

subdividing said two-dimensional symbol set into a plurality of t disjunct symbol subsets, each said t disjunct symbol subset comprising a number of symbols which is not an integer power of two, and each said t disjunct symbol subset comprising outer symbols located at the periphery of said two-dimensional symbol set and inner symbols of said two-dimensional symbol set;

separating said data bit stream into fixed-length blocks each said fixed-length block comprising a number of bits which is not an integer multiple of a given number m; each such block to be represented by w of said symbols;

expanding by trellis encoding each one of w separate p-bit subgroups derived from a first portion (s) of each said fixed-length block, and using each expanded said p-bit sub group for specifying one of said t symbol subsets;

block encoding, including expansion, a second portion (r) of each said fixed-length block, for deriving w separate q-bit subgroups, each said q-bit subgroup determining selection of one of the symbols of a specified said two-dimensional symbol set; and wherein said selection is performed for said outer symbols less frequently than for said inner symbols.

2. A method according to claim 1, for encoding data by symbols from a 144-symbol set subdivided into eight subsets, in which:

each said fixed-length block comprises 49 bits and is represented by w=8 symbols; said first portion (s) comprising sixteen bits, and said second portion (r) comprising thirty-three bits; said trellis encoding step effecting a rate ⅝ expansion; and said block encoding step effecting a rate 33/40 expansion.

3. A method according to claim 2, in which:

in said block encoding step, a step of generating eight labels is included, each said label comprising five bits identifying one symbol out of an 18-symbol subset comprised of sixteen inner symbols and two outer symbol; wherein one of said eight lables indentifies an outer said symbol, and seven of said labels identify inner said symbols.

4. A method according to claim 1, for encoding data by symbols from an 80-symbol set subdivided into eight subsets, in which:

each said fixed-length block comprises 21 bits and is represented by w=4 symbols; said first portion (s) comprising eight bits, and said second portion (r) comprising thirteen bits; said trellis encoding step effecting a rate ⅝ expansion; and said block encoding step effecting a rate 13/16 expansion.

5. A method according to claim 4, in which:

in said block encoding step, a step of generating four labels is included, each said label comprising four bits identifying one symbol out of a 10-symbol subset comprised of eight inner symbols and two outer symbols; wherein one of said four labels identifies an outer said symbol, and three of said labels identify inner said symbols.

6. A method in accordance with said block encoding step includes:

encoding said second portion (r) to generate w separate q-bit subgroups such that one subgroup selects an outer symbol, and (w−1) subgroups select (w−1) inner symbols from a specified subset.

7. Apparatus for encoding data by converting a bit stream representing the data into symbols of a two-dimensional expanded symbol set, which is not a power of two, said apparatus comprising:

buffer storage means (13) for receiving a block of bits of the data stream to be encoded, the number of bits of said block of bits being not an integer multiple of a given number m;

first scanning means (18) for selecting, in successive time intervals, each one of w separate p-bit subgroups of a first portion (17; s) of the bits stored in said buffer storage means;

convolutional encoding means (20) for receiving the bits of each p-bit subgroup (19) selected by said first scanning means, and for furnishing for each said p-bit subgroup an expanded bit group from the output of said convolutional encoding means to the first bit group of inputs of a symbol selection means (14);

block encoding means (22) connected to said buffer storage means for receiving a second portion (21; r) of the bits stored in said buffer storage means, and for furnishing a resulting expanded bit group (23) in w separate q-bit subgroups to second scanning means (24) for selecting, in successive time intervals, each one of said w q-bit output bit groups of said block encoding means, and for each of said w q-bit groups, furnishing a bit subgroup (25) to the second group of inputs of said symbol selection means, and said symbol selection means (14) for selecting one symbol of said two-dimensional expanded symbol set in response to first and second bit groups furnished to two groups of inputs of said symbol selection means; said first bit group being furnished to a first group (15) of said inputs specifying one of t disjunct subsets of symbols, each said t disjunct symbol subset comprising a number of symbols which is not an integer power of two; and said second bit group being furnished to a second group (16) of said inputs selecting one particular symbol of a specified said t disjunct symbol subset.

8. Apparatus according to claim 7, in which:

said buffer storage means (13) has a capacity to store blocks of 49 bits each;

said symbol selection means (14) providing an alphabet of 144 symbols subdivided into t=8 subsets;
said first scanning means (18) selecting eight separate bit groups of two bits each from a first portion (s) comprising sixteen bits;
said convolutional encoding means (20) effecting a rate ⅔ expansion; and
said block encoding means (22) receiving a second portion (r) comprising 33 bits, for expanding said second portion (r) into eight groups of five bits each.

9. Apparatus according to claim 8, which said block encoding means (22) receives a second portion (r) comprising 33 bits ($X_1, X_2, \ldots, X_{33}$) and provides eight output bit groups of five bits each ($Y_{n-i}^3, y_{n-i}^4, \ldots, y_{n-i}^7$) according to the following relation:

said buffer storage means has a capacity to store blocks of 21 bits each;
said symbol selection means providing an alphabet of 80 symbols subdivided into t=8 subsets
said first scanning means selecting four separate bit groups of two bits each from a first portion (s) comprising eight bits;
said convolutional encoding means effecting a rate ⅔ expansion; and
said block encoding means receiving a second portion (r) comprising 13 bits, for expanding said second portion (r) into four groups of four bits each.

11. Apparatus according to claim 10, in which said block means receives a second portion (r) comprising 13 bits ($X_1, X_2, \ldots, X_{13}$) and provides four output bit groups of four bits each ($Y_{n+i}^3, y_{n+i}^4, \ldots, y_{n+i}^6$) ac-

| $x_1x_2x_3x_4$ | $y_n^3y_n^4y_n^5y_n^6y_n^7$ | $y_{n-1}^3y_{n-1}^4y_{n-1}^5y_{n-1}^6y_{n-1}^7$ | $y_{n-2}^3y_{n-2}^4y_{n-2}^5y_{n-2}^6y_{n-2}^7$ | $y_{n-3}^3y_{n-3}^4y_{n-3}^5y_{n-3}^6y_{n-3}^7$ |
|---|---|---|---|---|
| 0XXX | $x_{26}0x_2x_3x_4$ | $x_{27}0x_5x_6x_7$ | $x_{28}0x_8x_9x_{10}$ | $x_{29}0x_{11}x_{12}x_{13}$ |
| 1000 | $x_{26}1000$ | $x_{27}0x_5x_6x_7$ | $x_{28}0x_8x_9x_{10}$ | $x_{29}0x_{11}x_{12}x_{13}$ |
| 1001 | $x_{27}0x_5x_6x_7$ | $x_{26}1000$ | $x_{28}0x_8x_9x_{10}$ | $x_{29}0x_{11}x_{12}x_{13}$ |
| 1010 | $x_{27}0x_5x_6x_7$ | $x_{28}0x_8x_9x_{10}$ | $x_{26}1000$ | $x_{29}0x_{11}x_{12}x_{13}$ |
| 1011 | $x_{27}0x_5x_6x_7$ | $x_{28}0x_8x_9x_{10}$ | $x_{29}0x_{11}x_{12}x_{13}$ | $x_{26}1000$ |
| 1100 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |
| 1101 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |
| 1110 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |
| 1111 | $x_{27}0x_5x_6x_7$ | $x_{28}0x_8x_9x_{10}$ | $x_{29}0x_{11}x_{12}x_{13}$ | $x_{30}0x_{14}x_{15}x_{16}$ |

| $x_1x_2x_3x_4$ | $y_{n-4}^3y_{n-4}^4y_{n-4}^5y_{n-4}^6y_{n-4}^7$ | $y_{n-5}^3y_{n-5}^4y_{n-5}^5y_{n-5}^6y_{n-5}^7$ | $y_{n-6}^3y_{n-6}^4y_{n-6}^5y_{n-6}^6y_{n-6}^7$ | $y_{n-7}^3y_{n-7}^4y_{n-7}^5y_{n-7}^6y_{n-7}^7$ |
|---|---|---|---|---|
| 0XXX | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1000 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1001 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1010 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1011 | $x_{30}0x_{14}x_{15}x_{16}$ | $x_{31}0x_{17}x_{18}x_{19}$ | $x_{32}0x_{20}x_{21}x_{22}$ | $x_{33}0x_{23}x_{24}x_{25}$ |
| 1100 | $x_{26}1000$ | $x_{31}0x_{17}x_{18}x_{19}$ | $x_{32}0x_{20}x_{21}x_{22}$ | $x_{33}0x_{23}x_{24}x_{25}$ |
| 1101 | $x_{31}0x_{17}x_{18}x_{19}$ | $x_{26}1000$ | $x_{32}0x_{20}x_{21}x_{22}$ | $x_{33}0x_{23}x_{24}x_{25}$ |
| 1110 | $x_{31}0x_{17}x_{18}x_{19}$ | $x_{32}0x_{20}x_{21}x_{22}$ | $x_{26}1000$ | $x_{33}0x_{23}x_{24}x_{25}$ |
| 1111 | $x_{31}0x_{17}x_{18}x_{19}$ | $x_{32}0x_{20}x_{21}x_{22}$ | $x_{33}0x_{23}x_{24}x_{25}$ | $x_{26}1000$. |

10. Apparatus according to claim 7, in which:

cording to the following relation:

| $x_1x_2x_3$ | $y_n^3y_n^4y_n^5y_n^6$ | $y_{n-1}^3y_{n-1}^4y_{n-1}^5y_{n-1}^6$ | $y_{n-2}^3y_{n-2}^4y_{n-2}^5y_{n-2}^6$ | $y_{n-3}^3y_{n-3}^4y_{n-3}^5y_{n-3}^6$ |
|---|---|---|---|---|
| 0XX | $x_{10}0x_2x_3$ | $x_{11}0x_4x_5$ | $x_{12}0x_6x_7$ | $x_{13}0x_8x_9$ |
| 100 | $x_{10}100$ | $x_{11}0x_4x_5$ | $x_{12}0x_6x_7$ | $x_{13}0x_8x_9$ |
| 101 | $x_{11}0x_4x_5$ | $x_{10}100$ | $x_{12}0x_6x_7$ | $x_{13}0x_8x_9$ |
| 110 | $x_{11}0x_4x_5$ | $x_{12}0x_6x_7$ | $x_{10}100$ | $x_{13}0x_8x_9$ |
| 111 | $x_{11}0x_4x_5$ | $x_{12}0x_6x_7$ | $x_{13}0x_8x_9$ | $x_{10}100$. |

* * * * *